(12) United States Patent
Moreton

(10) Patent No.: US 6,174,844 B1
(45) Date of Patent: Jan. 16, 2001

(54) OVERBASED METAL CALIXARATES, THEIR PREPARATION AND LUBRICATING OIL COMPOSITIONS CONTAINING THEM

(75) Inventor: David J Moreton, Hull (GB)

(73) Assignee: Lubrizol Adibis Holdings (UK) Limited, Merseyside (GB)

(*) Notice: Under 35 U.S.C. 154(b), the term of this patent shall be extended for 0 days.

(21) Appl. No.: 09/035,791

(22) Filed: Mar. 6, 1998

Related U.S. Application Data

(63) Continuation of application No. 08/685,832, filed on Jul. 25, 1996, now abandoned.

(30) Foreign Application Priority Data

Jul. 27, 1995 (GB) .................................................. 9515379

(51) Int. Cl.⁷ ................................................. C10M 159/22
(52) U.S. Cl. ............................................................. 508/585
(58) Field of Search ............................................. 508/585

(56) References Cited

U.S. PATENT DOCUMENTS

| 5,114,601 | * | 5/1992 | Cook et al. | 508/585 |
| 5,205,946 | * | 4/1993 | Cook et al. | 508/585 |
| 5,589,445 | * | 12/1996 | Leahy et al. | 508/585 |
| 5,602,084 | * | 2/1997 | Moreton | 508/585 |

FOREIGN PATENT DOCUMENTS

0450874A2 * 10/1991 (EP) .
0685553A3 * 12/1995 (EP) .

* cited by examiner

Primary Examiner—Jerry D. Johnson
(74) Attorney, Agent, or Firm—Michael F. Esposito, Esq.

(57) ABSTRACT

An overbased metal salt of a sulphur-free calixarene having a substituent hydroxyl group or groups available for reaction with a metal base, the calixarene having a molecular weight of at least 1880.

12 Claims, No Drawings

OVERBASED METAL CALIXARATES, THEIR PREPARATION AND LUBRICATING OIL COMPOSITIONS CONTAINING THEM

This is a continuation of application Ser. No. 08/685,832, filed Jul. 25, 1996, now abandoned.

The present invention relates to overbased metal salts of sulphur-free calixarenes having a substituent hydroxyl group or groups available for reaction with a metal base, their preparation and their use as detergents in lubricating oil compositions.

In the operation of the internal combustion engine by-products from the combustion chamber often blow by the piston and admix with the lubricating oil.

Compounds generally employed to neutralise the acidic materials and disperse sludge within the lubricating oil are the overbased alkaline earth metal sulphurised hydrocarbyl-substituted phenates, salicylates, napthenates and sulphonates. The term "overbased" is generally used to describe those alkaline earth metal hydrocarbyl-substituted salts in which the ratio of the number of equivalents of the alkaline earth metal moiety to the number of equivalents of the acid moiety is greater than one, and is usually greater than 1.2 and may be as high as 4.5 or greater. In contrast, the equivalent ratio of alkaline earth metal moiety to acid moiety in "normal" or "neutral" alkaline earth metal hydrocarbyl-substituted salts is one, and in "low-based" salts is less than one. Thus, the overbased material usually contains greater than 20% in excess of the alkaline earth metal present in the corresponding neutral material. For this reason overbased alkaline earth metal hydrocarbyl-substituted salts have a greater capability for neutralising acidic matter than do the corresponding neutral alkaline earth metal hydrocarbyl-substituted salts, though not necessarily an increased detergency power.

In the manufacture of the aforesaid sulphurised hydrocarbyl phenates, hydrogen sulphide is generated, which hydrogen sulphide is generally disposed of by burning, thereby producing sulphur dioxide, which is released to the atmosphere. Environmental concerns are growing over the use of sulphur-containing lubricant additives, due to the resulting sulphur dioxide emissions associated with lubricant combustion in service, as well as in additive production. In response to the perceived desirability of providing sulphur-free overbased metal salts suitable for use as detergent additives in lubricating oils EP-A-450874 discloses a non-sulphurised overbased metal salt of a sulphur-free calixarene having a substituent hydroxyl group or groups available for reaction with a metal base and their preparation by reacting at elevated temperature:

(A) either (i) a sulphur-free calixarene having a substituent hydroxyl group or groups available for reaction with metal base, (ii) a low-based metal calixarate, (iii) a neutral metal calixarate or (iv) an overbased metal calixarate, (B) a metal base added either in a single addition or in a plurality of additions at intermediate points during the reaction, (C) a solvent comprising either ($C_1$) either (i) a polyhydric alcohol having 2 to 4 carbon atoms, (ii) a di-($C_3$ or $C_4$) glycol, (iii) a tri-($C_2$–$C_4$) glycol or (iv) a mono- or poly-alkylene glycol alkyl ether of the formula:

$$R^9(OR^{10})_fOR^{11} \tag{III}$$

wherein in the formula (III) $R^9$ is a $C_1$ to $C_6$ alkyl group, $R^{10}$ is an alkylene group, e.g. of 1–6 or 2–4 carbon atoms, $R^{11}$ is hydrogen or a $C_1$ to $C_6$ alkyl group and f is an integer from 1 to 6, either alone or in combination with either ($C_2$) a hydrocarbon solvent or ($C_3$) either (i) water, (ii) $C_1$ to $C_{20}$ monohydric alcohol, (iii) a $C_1$ to $C_{20}$ ketone, (iv) a $C_1$ to $C_{10}$ carboxylic acid ester or (v) an aliphatic, alicyclic or aromatic $C_1$ to $C_{20}$ ether, or, ($C_4$) a $C_1$ to $C_4$ monohydric alcohol, in combination with a hydrocarbon solvent ($C_2$), and (D) carbon dioxide added subsequent to each addition of component (B).

It is important that the process be tolerant to plant conditions, particularly in relation to the glycolation and carbonation steps, i.e. addition of (C) and (D) respectively in the process described hereinabove otherwise sediment content may be unduly high or the product may be less workable than is desirable. We have found that the robustness of the process which is a term coined to embrace tolerance to plant conditions, achievement of a workable product and acceptable sediment contents improves with increasing molecular weight of the calixarene from which the overbased metal salt is derived. A practical consequence of improved robustness is that high AV (Alkalinity Values as measured by the method of ASTM D2896) typically an AV of at least 370, for example about 450, and as high as 500, or more, are readily achievable.

Accordingly in one aspect the present invention provides an overbased metal salt of a sulphur-free calixarene having a substituent hydroxyl group or groups available for reaction with a metal base, the calixarene having a molecular weight of at least 1880.

For a review of calixarenes the reader is referred to 'Monographs in Supramolecular Chemistry' by C David Gutsche, Series Editor—J Fraser Stoddart, published by the Royal Society of Chemistry, 1989. Calixarenes having a substituent hydroxyl group or groups include homocalixarenes, oxacalixarenes, homooxacalixarenes and heterocalixarenes.

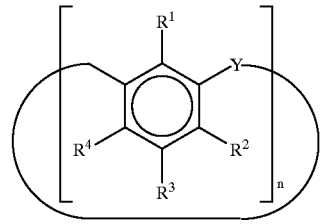

(I)

wherein Y is a divalent bridging group;

$R^3$ is hydrogen, a hydrocarbyl or a hetero-substituted hydrocarbyl group;

either $R^1$ is hydroxyl and $R^2$ and $R^4$ are independently either hydrogen, hydrocarbyl or hetero-substituted hydrocarbyl, or $R^2$ and $R^4$ are hydroxyl and $R^1$ is either hydrogen, hydrocarbyl or hetero-substituted hydrocarbyl;

and n has a value of at least 4.

When $R^1$ is hydrogen, $R^2$ and $R^4$ are hydroxyl, and $R^3$ is either hydrogen, hydrocarbyl or hetero-substituted hydrocarbyl in the formula (I) the calixarene is a resorcinarene.

In the formula (I) Y may suitably be $(CHR^6)_d$ in which $R^6$ is either hydrogen or hydrocarbyl, e.g. of 1–6 carbons such as methyl and d is an integer which is at least one, n preferably is at least 6, more preferably at least 3, e.g. at least 9. Any heterosubstituted hydrocarbyl group has the heteroatom, preferably —O— or =NH, interrupting a chain of carbon atoms, such as an alkoxy-alkyl group of 2–20 carbons.

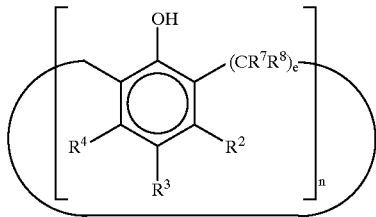

(II)

wherein $R^2$ and $R^4$ are independently either hydrogen, hydrocarbyl or hetero-substituted hydrocarbyl, $R^3$ is either hydrocarbyl or hetero-substituted hydrocarbyl; either one of $R^7$ and $R^8$ is hydrogen and the other is either hydrogen or hydrocarbyl, n has a value of at least 6, preferably at least 8, typically at least 9 and e is one or greater, e.g. 1–4.

Preferably in the formula (II) $R^2$ and $R^4$ are hydrogen; $R^3$ is hydrocarbyl, preferably alkyl of greater than 4, preferably greater than 9, more preferably greater than 12 carbon atoms; one of $R^7$ or $R^8$ is hydrogen and the other is either hydrogen or alkyl, preferably hydrogen, n is at least 8, preferably at least 9, and up to 12. Alternatively, $R^3$ in the formula (III) may be a hydrocarbyl group derived from a polyolefin, for example polyethylene, polypropylene, polybutylene or a polyolefin copolymer, for example an ethylene/propylene copolymer, preferably from a polyisobutene. Examples of $R^3$ include dodecyl and octadecyl.

A molecular weight of the calixarene of at least 1880 comprises two variable contributions, the first being that from the hydrocarbyl substituents(s) on the aromatic nucleus and the second being that from the number of units in the cyclic polymer, i.e. the value of n in the formulae (II) and (III). Thus with reference to the calixarene of the formula (III) when $(CR^7R^8)_e$ is $CH_2$, $R^2$ and $R^4$ are hydrogen and $R^3$ is, for example octadecyl, the value of n must be for a non-homogeneous calixarene, i.e. one comprised of a number of rings of different sizes, an average of at least 5.4 and for a homogeneous calixarene, i.e. one comprised of rings of the same size, at least 6.

The metal moiety of the salts may suitably be either an alkali or an alkaline earth metal, or indeed any metal capable of forming salts with calixarenes. Preferred metals include calcium, magnesium or barium. A particularly preferred metal is calcium. Mixtures of metals may also be employed. The salts will hereinafter be termed "calixarates". Overbased calixarates, the subject of the present invention, are calixarates in which the ratio of the number of equivalents of the metal moiety to the number of equivalents of the calixarene moiety is greater than one.

Calixarenes may suitably be prepared by the method described in the aforesaid Monograph, Chapter 2. Typically an alkyl phenol unsubstituted at the ortho-positions may be reacted in the presence of a base as catalyst with an aldehyde, such as formaldehyde, generally in one of its polymeric forms.

In another aspect the present invention provides a process for the production of an overbased calixarate as hereinbefore described which process comprises reacting at elevated temperature:

(A) either (i) a sulphur-free calixarene having a substituent hydroxyl group or groups available for reaction with metal base and having a molecular weight of at least 1880 or (ii) either a low-based or a neutral or an overbased metal calixarate derived from a sulphur-free calixarene having a substituent hydroxyl group or groups available for reaction with metal base and having a molecular weight of at least 1880, (B) a metal base added either in a single addition or in a plurality of additions at intermediate points during the reaction, (C) a solvent comprising either:
  ($C_1$) either (i) a polyhydric alcohol having 2 to 4 carbon atoms, (ii) a di-($C_3$ or $C_4$) glycol, (iii) a tri-($C_2$–$C_4$) glycol or (iv) a mono- or poly-alkylene glycol alkyl ether of the formula:

$$R^9(OR^{10})_fOR^{11} \quad (III)$$

wherein in the formula (III) $R^9$ is a $C_1$ to $C_6$ alkyl group, $R^{10}$ is an alkylene group e.g. of 1–6 or 2–4 carbon atoms, $R^{11}$ is hydrogen or a $C_1$ to $C_8$ alkyl group and f is an integer from 1 to 6, optionally in combination with either (a) a hydrocarbon solvent or (b) either (i) water, (ii) a $C_1$ to $C_{20}$ monohydric alcohol, (iii) a ketone having up to 20 carbon atoms, (iv) a carboxylic ester having up to 10 carbon atoms or (v) an aliphatic, alicyclic or aromatic ether having up to 20 carbon atoms, or, ($C_2$) a $C_1$ to $C_4$ monohydric alcohol, in combination with a hydrocarbon solvent (a), and (D) carbon dioxide added subsequent to each addition of component (B).

With regard to component (A) this may be either (i) a sulphur-free calixarene having a substituent hydroxyl group or groups available for reaction with metal base and having a molecular weight of at least 1880; or (ii) a low-based or a neutral or an overbased calixarate derived from a calixarene as aforesaid. Suitable calixarenes (i) are those as hereinbefore described, particularly those alkyl calixarenes capable of conferring oil-solubility on the product. Pre-formed calixarates wherein the equivalent ratio of metal base moiety to calixarene is either 1 (neutral calixarates) or less than 1 (low-based calixarates) may be employed to produce an overbased calixarate. Alternatively, an overbased calixarate according to the present invention may be employed, in which case the product is a calixarate having an increased degree of overbasing, i.e. a higher alkalinity value.

In addition to one of the alternatives (i) to (iii), component (A) may further include a compound of the general formula:

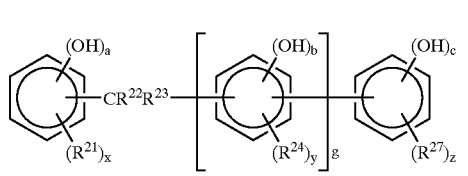

(IV)

wherein a, b and c each independently represent 1 or 2;
x, y and z each independently represent zero or an integer from 1 to 3;
$R^{21}$, $R^{24}$ and $R^{27}$ independently represent either hydrogen or a hydrocarbyl group, when x, y or z is greater than 1, each $R^{21}$, each $R^{24}$ or each $R^{27}$ respectively being the same or different;
$R^{22}$, $R^{23}$, $R^{25}$ and $R^{26}$ independently represent hydrogen or an alkyl group; and g is an integer from 1 to 20.

Preferred compounds of the formula (IV) are those in which a, b and c are 1; x, y and z are 1; $R^{21}$ $R^{24}$ and $R^{27}$ is preferably a $C_1$ to $C_{24}$ alkyl group, more preferably a $C_1$–$C_{12}$ alkyl group; either $R^{22}$=$R^{23}$=$R^{25}$=$R^{26}$=hydrogen or $R^{22}$=$R^{25}$=hydrogen and $R^{23}$=$R^{26}$=methyl; and g is preferably from 2 to 7, more preferably 3. Where $R^{22}$, $R^{23}$, $R^{25}$ and $R^{26}$ all represent hydrogen, the compound of general formula (IV) can be prepared by the condensation of the corresponding phenol with formaldehyde. Where one of $R^{22}$ and $R^{23}$ and one of $R^{25}$ and $R^{26}$ is hydrogen and the other is a hydrocarbyl group, for example a lower alkyl group, an aldehyde other than formaldehyde is used in the condensation with the phenol. The mixture of overbased salts and any low-based, neutral or unreacted compounds resulting from the use of the mixed feed is useful as a lubricating oil additive.

Component (B) is a metal base. The metal moiety may suitably be an alkali or alkaline earth metal, preferably an alkaline earth metal. The alkaline earth metal is preferably calcium, magnesium or barium, more preferably calcium. The base moiety may suitably be an oxide or a hydroxide, preferably the hydroxide. A calcium base may be added, for example, in the form of quick lime (CaO) or in the form of slaked lime (Ca(OH)$_2$) or mixtures of the two in any proportions. Component (B) may be added in whole to the initial reactants or in part to the initial reactants and the remainder in one or more further additions at intermediate points during the reaction.

Component (C) is a solvent for the reactants. The solvent (C) may be either ($C_1$) optionally in combination with either (a) or (b), or ($C_2$). ($C_1$) is either (i) a polyhydric alcohol having 2 to 4 carbon atoms, (ii) a di-($C_3$ or $C_4$) glycol, (iii) a tri-($C_2$ to $C_4$) glycol or (iv) a mono- or poly-alkylene glycol alkyl ether of the formula:

$$R^9(OR^{10})_fOR^{11} \quad\quad\quad (III)$$

wherein in the formula (III) $R^9$ is a $C_1$ to $C_6$ alkyl group, $R^{10}$ is an alkylene group, $R^{11}$ is hydrogen or a $C_1$ to $C_6$ alkyl group and f is an integer from 1 to 6. Suitable compounds having the formula (III) include the monomethyl or dimethyl ethers of (a) ethylene glycol, (b) diethylene glycol, (c) triethylene glycol or (d) tetraethylene glycol. A suitable compound is methyl diglycol (CH$_3$OCH$_2$CH$_2$OCH$_2$CH$_2$OH). Mixtures of glycol ethers and glycols may also be employed. The polyhydric alcohol may suitably be either a dihydric alcohol, for example ethylene glycol or propylene glycol, or a trihydric alcohol, for example glycerol. The di-($C_3$ or $C_4$) glycol may suitably be dipropylene glycol, the tri-($C_2$ to $C_4$) glycol may suitably be triethylene glycol. Preferably the component ($C_1$) is either ethylene glycol or methyl diglycol.

(a) is a hydrocarbon solvent which may be aliphatic or aromatic. Examples of suitable hydrocarbons include toluene, xylene, naphtha and aliphatic paraffins, for example hexane, and cycloaliphatic paraffins.

(b) may be either (i) water, (ii) a $C_1$ to $C_{20}$ monohydric alcohol, (iii) a ketone having up to 20 carbon atoms, (iv) a carboxylic acid ester having up to 10 carbon atoms or (v) an aliphatic, alicyclic or aromatic ether having up to 20 carbon atoms. Examples are methanol, 2-ethyl hexanol, cyclohexanol, cyclohexanone, benzyl alcohol, ethyl acetate and acetophenone.

($C_2$) may be a $C_1$ to $C_4$ monohydric alcohol, preferably methanol, in combination with (a), preferably toluene.

Preferred solvents (C) comprise ethylene glycol, a mixture of ethylene glycol and 2-ethyl hexanol and a mixture of methanol and toluene.

Generally, in view of the intended use of the product, it is preferred to incorporate a lubricating oil as a supplemental solvent. The lubricating oil may suitably be an animal, a vegetable or a mineral oil. Suitably the lubricating oil is a petroleum-derived lubricating oil, such as a naphthenic base, paraffin base or mixed base oil. Solvent neutral oils are particularly suitable. Alternatively, the lubricating oil may be a synthetic lubricating oil. Suitable synthetic lubricating oils include synthetic ester lubricating oils, which oils include diesters such as di-octyl adipate, di-octyl sebacate and tri-decyladipate, or polymeric hydrocarbon lubricating oils, for example liquid polyisobutenes and poly-alpha olefins.

Component (D) is carbon dioxide, added subsequent to each addition of component (B). Carbon dioxide may be added in the form of a gas or a solid, preferably in the form of a gas. In gaseous form it may suitably be blown through the reaction mixture.

Preferably the reaction mixture may additionally incorporate as Component (E) either (i) a $C_6$ to $C_{100}$ carboxylic acid or an anhydride thereof, (ii) a di- or polycarboxylic acid containing from 36 to 100 carbon atoms or an anhydride thereof, (iii) a hydrocarbyl-substituted sulphonic acid or an anhydride thereof, (iv) a hydrocarbyl-substituted salicylic acid or an anhydride thereof, (v) a hydrocarbyl-substituted naphthenic acid or an anhydride thereof, (vi) a hydrocarbyl-substituted phenol or (vii) a mixture of any two of (i) to (vi). Of the aforesaid alternatives Component (E) is preferably (i).

As regards (i), this is preferably an acid having the formula:

(V)

wherein $R^{12}$ is a $C_{10}$ to $C_{24}$ alkyl or alkenyl group and $R^{13}$ is either hydrogen, a $C_1$ to $C_4$ alkyl group or a —CH$_2$COOH group. Preferably $R^{12}$ in the formula (V) is an unbranched alkyl or alkenyl group. Preferred acids of formula (V) are those wherein $R^{13}$ is hydrogen and $R^{12}$ is a $C_{10}$ to $C_{24}$, more preferably $C_{18}$ to $C_{24}$ unbranched alkyl group. Examples of suitable saturated carboxylic acids of formula (V) include capric, lauric, myristic, palmitic, stearic, isostearic, arachidic, behenic and lignoceric acids. Example of suitable unsaturated acids of formula (V) include lauroleic, myristoleic, palmitoleic, oleic, gadoleic, erucic, ricinoleic, linoleic and linolenic acids. Mixtures of acids may also be employed, for example rape top fatty acids. Particularly suitable mixtures of acids are those commercial grades containing a range of acids, including both saturated and unsaturated acids. Such mixtures may be obtained synthetically or may be derived from natural products, for example tall, cotton, ground nut, coconut, linseed, palm kernel, olive, palm, castor, soyabean, sunflower, herring and sardine oils and tallow.

Instead of, or in addition to, the carboxylic acid there may be used the acid anhydride, the acid chloride or the ester derivatives of the acid, preferably the acid anhydride. It is preferred however to use a carboxylic acid or a mixture of carboxylic acids. A preferred carboxylic acid of formula (V) is stearic acid. The acid may suitably be present in an amount up to 40% w/w, based on the total weight of the final product. It is believed that the acid, when present, chemically modifies the overbased calixarate product.

As regards (ii), this is preferably a polyisobutene succinic acid or a polyisobutene succinic anhydride.

As regards (iii), (iv), (v) and (vi), the hydrocarbyl substituent may suitably contain up to 125 aliphatic carbon atoms. Examples of suitable substituents include alkyl radicals, for example hexyl, cyclohexyl, octyl, isoctyl, decyl, tridecyl, hexadecyl, eicosyl and tricosyl, radicals derived from the polymerisation of both terminal and internal olefins, for example ethene, propene, 1-butene, isobutene, 1-hexene, 1-octene, 2-butene, 2-pentene, 3-pentene and 4-octene. Preferably the hydrocarbyl substituent is one derived from a polypropylene, poly-1-butene or polyisobutene, more preferably polyisobutene.

The reaction mixture may also incorporate as component (F) a catalyst (or promoter) for the reaction. The catalyst may be an organic compound or an inorganic compound. Suitable organic compounds include (i) organic halides or (ii) organic alkanoates, which may suitably be represented by the formula:

$$R^{14}\text{—}X \tag{VI}$$

wherein in the formula (VI) $R^{14}$ is either an alkyl, aryl or alkaryl group preferably having 3–20 or 6–20 or 7–20 carbons respectively, or halo-derivative thereof and X is either halogen, suitably chlorine, bromine or iodine, preferably chlorine, or the group $OCOR^{15}$ wherein $R^{15}$ is suitably $C_1$ to $C_4$ alkyl. Alternatively, the organic halide may be an HX salt of an organic base, for example guanidine hydrochloride. A suitable example of an organic halide of the formula (VI) is octyl chloride. Mixtures of (i) and (ii) may also be employed. Suitably the amount of organic compound (F) employed may be up to 2.0% by weight based on the weight of the reaction mixture. Suitable inorganic compound catalysts include inorganic halides, particularly inorganic chlorides, and inorganic alkanoates. Examples of suitable inorganic compound catalysts include calcium acetate, calcium chloride, ammonium chloride, ammonium acetate, aluminium chloride and zinc chloride, of which calcium chloride and calcium acetate are preferred. Suitably the amounts of the inorganic compound catalyst employed may be up to 2.0% by weight based on the weight of the reaction mixture. Provided that the catalyst is present during the carbonation step, it may be added at any point in the process, though it will usually be found convenient to add the catalyst initially.

In order to produce an overbased calixarate from component (A)(i) or (A)(ii) it is necessary only to react the (A) component with components (B), (C) and (D), using the appropriate proportions of components (A) and (B) to achieve overbasing. Suitably component (B) may be added in one or more additions, preferably in a single addition.

In order to produce a high AV (Alkalinity Value) overbased calixarate there may be employed an overbased metal calixarate derived from a sulphur-free calixarene having a substituent group or groups available for reaction and having a molecular weight of at least 1880, and it is preferred to employ component (E), particularly either (E)(i) or (ii) and more particularly stearic acid, whilst at the same time adjusting the relative amounts of components (A) and (B) to a value sufficient to produce the high AV desired. Again, component (B) may suitably be incorporated in one or more additions, preferably in a single addition.

Suitably the elevated temperature at which the process is operated may be a temperature in the range from 15 to 200° C., preferably from 50 to 175° C. The selection of the optimum temperature within the aforesaid range will depend to a large extent on the nature of the solvent employed.

Generally, the process will be operated in the presence of a lubricating oil. At the conclusion of the process it is preferred to recover the salt as a solution in lubricating oil by separating off volatile fractions, for example by distillation at subatmospheric pressure.

Finally, it is preferred to filter the solution. Alternatively, the solution may be centrifuged.

In another aspect the present invention provides an additive composition suitable for use in lubricating oils which composition comprises a lubricating oil and an overbased metal calixarate as hereinbefore described, the lubricating oil comprising from 10 to 80% by weight based on the weight of the composition.

The additive composition may suitably be obtained by the process of the invention, using a solvent comprising a lubricating oil.

The additive composition may suitably have an AV of at least 370, preferably at least 390.

In another aspect the present invention also provides an additive suitable for use in lubricating oils which composition comprises as a first component an overbased calixarate as hereinbefore described and as a second component a neutral and/or an overbased metal salt of at least one of (i) a $C_6$ to $C_{100}$ carboxylic acid, (ii) a di- or polycarboxylic acid containing from 36 to 100 carbon atoms, (iii) a hydrocarbyl-substituted sulphonic acid, (iv) a hydrocarbyl-substituted salicylic acid, (v) a hydrocarbyl-substituted naphthenic acid or (vi) a hydrocarbyl-substituted phenol.

Suitably the metal moiety of the salts in the additive composition may be either an alkali or an alkaline earth metal, preferably an alkaline earth metal, more preferably calcium, magnesium or barium.

The additive composition may be prepared simply by mixing the components. Preferably, however the composition is prepared by reacting components (A), (B), (C), (D) and (E), and optionally (F).

The overbased calixarates of the invention are useful in lubricating oils both for their acids neutralisation capability and their detergent and antioxidant properties.

In a final aspect the present invention provides a finished lubricating oil composition which composition comprises a lubricating oil and an overbased metal salt of a sulphr-free calixarene as hereinbefore described, the overbased metal salt being present in an amount of from 0.1 to less than 20 percent by weight based on the weight of the finished lubricating oil composition.

The finished lubricating oil composition may also contain effective amounts of one or more other types of conventional lubricating oil additives, for example viscosity index improvers, anti-wear agents, antioxidants, dispersants, rust inhibitors, pour-point depressants, or the like.

The invention will now be further illustrated by reference to the following Examples. In all the Examples the term AV (Alkalinity Value) is used. AV is expressed in terms of mg KOH/g as measured by ASTM D2896. In the Examples where lime is used, it is in the form of slaked lime, $Ca(OH)_2$. Viscosities were measured by the method of ASTM D445.

Comparison Test p-nonylcalix[6,8]arate, 400 AV

An apparatus was set up consisting of a 1 liter wide neck round bottomed flask, flange lid, overhead stirrer with paddle and PTFE gland, stillhead connected to double surface condenser, receiver adaptor (vacuum) with receiver flask cooled by a butanol/$C0_2$ (S) bath and a mantle/Eurotherm/thermocouple heating system. The apparatus above the mantle and up to the condenser was insulated with glass wool.

The wide neck flask was charged with a 13.68% solution of p-nonylcalixarene (mainly 6–8 ring size) in xylene (264 g, MW=232 per repeating unit, 0.156 moles, 1 equiv.), SN150 lubricating oil (90 g, solvent) and nonyl phenol (9 g, 0.041 moles, 0.26 equivs.) and heated with stirring to 100° at 29" Hg pressure, to remove all xylene. The vacuum was broken and the vessel charged with 2-ethyl hexanol (222 g, solvent) calcium hydroxide (90 g, 1.21 moles, 7.78 equivs.) stearic acid (100 g, 0.352 moles, 2.26 equivs) and calcium acetate (6 g, 0.038 moles, 0.24 equivs.) and then heated to 130° C. under 11" Hg vacuum for 15 mins. The ethylene glycol (136 g, 0.581 moles, 3.72 equivs) was then added and 11" Hg/130° C. applied for 1 hour. The reaction was then carbonated using a dip tube connected to a Buchner flask containing solid carbon dioxide (100 g, 2.27 moles, 14.55 equivs.) at 130° C. and atmospheric pressure. The reaction was then heated at 200° C./29" Hg to remove all solvents, then the crude product was filtered hot through a ½" celite pad to give a brown clear liquid.

| Ca | = 14.1% |
|---|---|
| AV | = 408 |
| $V_{100}$ | = 42 cSt |
| Crude Sediment | = 4.2% |

EXAMPLE 1

450 AV dodecyl calix[10–12]arate

The apparatus described in the Comparison Test was set up and charged with the same ingredients except the calixarene was dodecylcalixarene with mainly 10–12 membered rings (MW=274 per repeating unit, 50% solution in SN150 lube oil, 41.6 g, 0.074 moles, 1 equiv.) Extra oil was added (79 g) because the calixarene solution was more concentrated. More calcium hydroxide was added, so that 450 AV would be reached (104 g, 1.368 moles, 18.36 equivs.). The amount of dodecyl phenol (12 g, 0.045 moles, 0.61 equivs.) and stearic acid (85 g 0.30 moles, 4.02 equivs.) were also altered slightly. A small amount of ethylene glycol (6 g, 0.097 moles, 1.30 equivs.) was also added.

The ingredients were heated to 90° C. and then 29" Hg vacuum applied for 10 minutes. The vacuum was reduced to 11" Hg and then the mixture was heated to 130° C. for 5 minutes. More ethylene glycol (36 g, 0.581 moles 7.79 equivs.) was then added and the reaction held at 130° C./11" Hg for 5 mins. The vacuum was then released and the reaction carbonated by the method described in the Comparison Test with solid carbon dioxide (85 g, 1.932 moles, 25.92 equivs.) and then stripped of solvent at 210° C./29" Hg.

The crude product was filtered hot through a ½" Celite pad to give the following product.

| Crude sediment | = 2.4% |
|---|---|
| AV | = 447 |
| Ca | = 15.7% |
| $V_{100}$ | = 642 cSt |

| Crude product weight | = 340 g |
|---|---|
| Crude sediment | = 2.4% |
| AV of product | = 438 |
| Ca content of product | = 15.0% |

EXAMPLE 2

440 AV Octadecylcalix [8] arate

The apparatus described in the Comparison Test was set up and charged with the same ingredients except that instead of p-nonylcalixarene there was charged octadecylcalixarene having mainly 8-membered rings (M.Wt.=358 per repeating unit; 50% solution in SN150 lube oil; 60.2 g; 87 m mol; 1 equiv.) and extra lime was used in order to attain an AV of about 440 (106.3 g; 1.41 moles; 16.67 equivs.). The lubricating oil was reduced accordingly to 56 g. The amounts of the other ingredients remained the same except that the nonylphenol was replaced with a w/w equivalent amount of dodecylphenol and an extra 6 g (0.097 moles, 1.1 equivs.) of ethylene glycol was added.

The procedure as described in the Comparison Test was then followed, giving the following results:

Crude product weight=340 g

Crude sediment=2.4%

AV of product=438

Ca content of product=15.0%

The Comparison Test is not an example according to the present invention because the molecular weight of the calixarene from which the overbased salt is derived is below 1880. It demonstrates that although a calixarate concentrate having an AV of 408 can be produced from a lower molecular weight calixarene (M.Wt.=1642) the robustness of the product in terms of a high crude sediment content is unacceptably low. On the other hand the Examples demonstrate that calixarates having an even higher AV (447 and 438) and an acceptable crude sediment content can be produced from calixarenes of much higher molecular weight.

We claim:

1. An overbased metal salt of a sulphur-free calixarene having a substituent hydroxyl group or groups available for reaction with a metal base; said calixarene having a molecular weight of at least 1880, said overbased metal salt having an alkalinity value of 438 or higher.

2. An overbased metal salt according to claim 1 wherein said calixarene has the formula(I):

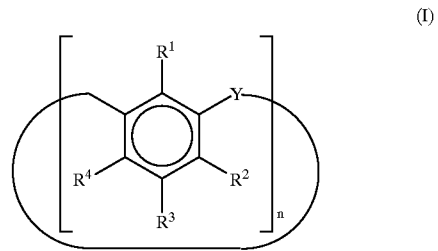

(I)

wherein:

Y is a divalent bridging group;

$R^3$ is hydrogen, a hydrocarbyl or a hetero-substituted hydrocarbyl group;

either $R^1$ is hydroxyl and $R^2$ and $R^4$ are independently either hydrogen, hydrocarbyl or hetero-substituted hydrocarbyl, or $R^2$ and $R^4$ are hydroxyl and $R^1$ is either hydrogen, hydrocarbyl or hetero-substituted hydrocarbyl; and n has a value of at least 4.

3. An overbased metal salt according to claim 1 wherein said calixarene has the formula (II):

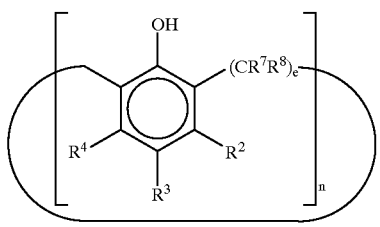

(II)

wherein:
- $R^2$ and $R^4$ are independently either hydrogen, hydrocarbyl or hetero-substituted hydrocarbyl;
- $R^3$ is either hydrocarbyl or hetero-substituted hydrocarbyl;
- either one of $R^7$ and $R^8$ is hydrogen and the other is either hydrogen or hydrocarbyl;
- n has a value of at least 6; and
- e is one or greater.

4. An overbased metal salt according to claim 3 wherein in the formula (II) $R^2$ and $R^4$ are hydrogen; $R^3$ is alkyl of greater than 4 carbon atoms; $R^7$ and $R^8$ are hydrogen; and n is at least 8.

5. An additive composition suitable for use in lubricating oils which composition comprises a lubricating oil and an overbased metal salt of a sulphur-free calixarene as claimed in claim 1, said lubricating oil comprising from 10 to 80% by weight based on the weight of the composition.

6. An additive composition according to claim 5 having an AV of about 450 or more.

7. An additive suitable for use in lubricating oils which composition comprises as a first component an overbased metal salt of a sulphur-free calixarene as claimed in claim 1 and as a second component a neutral and/or an overbased metal salt of at least one of
   (i) a $C_6$ to $C_{100}$ carboxylic acid,
   (ii) a di- or polycarboxylic acid containing from 36 to 100 carbon atoms,
   (iii) a hydrocarbyl-substituted sulphonic acid,
   (iv) a hydrocarbyl-substituted salicylic acid,
   (v) a hydrocarbyl-substituted naphthenic acid, or
   (vi) a hydrocarbyl-substituted phenol.

8. A finished lubricating oil composition which comprises a lubricating oil and an overbased metal salt of a sulphur-free calixarene as claimed in claim 1, said overbased metal salt being present in an amount of from 0.1 to less than 20 percent by weigt based on the weight of the finished lubricating oil composition.

9. A process for the production of an overbased metal salt of a sulphur-free calixarene having a substituent hydroxyl group or groups available for reaction with a metal base, said calixarene having a molecular weight of at least 1880, said overbased metal salt having an alkalinity value of 438 or higher, which process comprises reacting at elevated temperature:
   (A) either (i) a sulphur-free calixarene having a substituent hydroxyl group or groups available for reaction with metal base and having a molecular weight of at least 1880 or (ii) either a low-based or a neutral or an overbased metal sulphur-free calixarate derived from a sulphur-free calixarene having a substituent hydroxyl group or groups available for reaction with metal base and having a molecular weight of at least 1880,
   (B) a metal base added either in a single addition or in a plurality of additions at intermediate points during the reaction,
   (C) a solvent comprising either:
      ($C_1$) either (i) a polyhydric alcohol having 2 to 4 carbon atoms, (ii) a di-($C_3$ or $C_4$) glycol, (iii) a tri-($C_2$ to $C_4$) glycol of (iv) a mono-or poly-alkylene glycol alkyl ether of the formula (III):

$$R^9(OR^{10})_fOR^{11} \quad (III)$$

wherein in the formula (III) $R^9$ is a $C_1$ to $C_6$ alkyl group, $R^{10}$ is an alkylene group, $R^{11}$ is hydrogen or a $C_1$ to $C_8$ alkyl group and f is an integer from 1 to 6, optionally in combination with either:
      (a) a hydrocarbon solvent, or
      (b) either (i) water, (ii) a $C_1$ to $C_{20}$ monohydric alcohol, (iii) a ketone having up to 20 carbon atoms, (iv) a carboxylic acid ester having up to 10 carbon atoms, or (v) an aliphatic, alicyclic or aromatic ether having up to 20 carbon atoms, or
      ($C_2$) a $C_1$ to $C_4$ monohydric alcohol in combination with a hydrocarbon solvent (a), and
   (D) carbon dioxide added subsequent to each addition of component (B), wherein the relative amounts of components (A) and (B) are sufficient to produce said alkalinity value of 438 or higher.

10. A process according to claim 9 wherein a lubricating oil is incorporated as a supplemental solvent.

11. A process according to claim 9 wherein said reaction mixture further incorporates as Component (E) an acid having the formula (V):

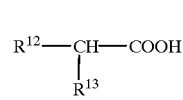

(V)

wherein $R^{12}$ is a $C_{10}$ to $C_{24}$ alkyl or alkenyl group and $R^{13}$ is either hydrogen, a $C_1$ to $C_4$ alkyl group or a —$CH_2COOH$ group.

12. A process according to claim 9 wherein there is also incorporated as component (F) a catalyst (or promoter) for the reaction.

* * * * *